United States Patent [19]

Martinez et al.

[11] Patent Number: 4,894,354

[45] Date of Patent: Jan. 16, 1990

[54] METHOD OF MAKING A CONVERSION CATALYST HAVING AN ANATASE VANADIUM PASSIVATING AGENT FOR TREATING A HEAVY HYDROCARBON FEEDSTOCK

[75] Inventors: Nelson P. Martinez, San Antonio de Los Altos; Jose R. Velasquez; Juan A. Lujano, both of Caracas, all of Venezuela

[73] Assignee: Intevep, S.A., Caracas, Venezuela

[21] Appl. No.: 263,814

[22] Filed: Oct. 28, 1988

Related U.S. Application Data

[60] Division of Ser. No. 109,409, Oct. 19, 1987, Pat. No. 4,816,135, and a continuation-in-part of Ser. No. 864,812, May 19, 1986, Pat. No. 4,704,375.

[51] Int. Cl.$^4$ ............................................. B01J 29/06
[52] U.S. Cl. ........................................ 502/64; 502/68; 502/521
[58] Field of Search ................. 502/64, 214, 217, 242, 502/521, 68, 77, 78, 79; 208/52 CT, 113, 114, 120

[56] References Cited

U.S. PATENT DOCUMENTS

| | | | |
|---|---|---|---|
| 2,258,787 | 10/1941 | Melaven et al. | 208/119 |
| 2,344,911 | 3/1944 | Young | 208/119 |
| 2,726,991 | 12/1955 | Zimmershied et al. | 502/208 |
| 3,696,025 | 10/1972 | Chessmore et al. | 208/113 |
| 4,369,108 | 1/1983 | Bertolacini et al. | 208/113 |
| 4,466,884 | 8/1984 | Occelli et al. | 208/113 |
| 4,482,643 | 11/1984 | Harju et al. | 502/242 |
| 4,552,647 | 11/1985 | Hettinger, Jr. et al. | 208/120 |
| 4,576,709 | 3/1986 | Miller et al. | 208/120 |
| 4,663,300 | 5/1987 | Lester et al. | 502/66 |
| 4,735,927 | 4/1988 | Gerdes et al. | 502/64 |

*Primary Examiner*—Paul E. Konopka
*Attorney, Agent, or Firm*—Bachman & LaPointe

[57] ABSTRACT

A method for making a catalyst containing a vanadium passivating agent in the form of anatase crystalline $TiO_2$ including a method for processing hydrocarbon feeds containing vanadium.

8 Claims, No Drawings

METHOD OF MAKING A CONVERSION CATALYST HAVING AN ANATASE VANADIUM PASSIVATING AGENT FOR TREATING A HEAVY HYDROCARBON FEEDSTOCK

CROSS REFERENCE TO RELATED APPLICATIONS

This application is a Division of Application Ser. No. 109,409, filed Oct. 19, 1987, now U.S. Pat. No. 4,816,135, issued Mar. 28, 1989, which in turn is a continuation-in-part of Application Ser. No. 864,812, filed May 19, 1986, now U.S. Pat. No. 4,704,375, issued Nov. 3, 1987.

BACKGROUND OF THE INVENTION

The present invention is drawn to a fluid catalytic cracking (FCC) catalyst for processing hydrocarbon feeds having significant concentrations of vanadium and, more particularly, a fluid catalytic cracking catalyst comprising a vanadium passivating agent and method for making same. Catalytic cracking catalysts comprising zeolites dispersed into a matrix have been employed for many years in catalytic cracking of hydrocarbons. Materials contained in the feedstocks have a poisonous effect on the catalysts in that they lower catalytic activity and selectivity for gasoline production and reduce catalyst life. Particularly, vanadium effects on catalytic activity have been described in detail in the literature. Heretofore the effects of vanadium on catalytic activity have been decreased by employing compounds such as antimony, tin, barium, manganese and bismuth, see for example U.S. Pat. Nos. 3,711,422, 4,101,417, 4,377,494 and 3,977,963. In addition, the prior art has employed such materials as calcium containing additives as a passivating agent. See for example U.S. Pat. No. 4,455,315.

SUMMARY OF THE INVENTION

In accordance with the present invention, a catalyst is provided for use in the conversion of hydrocarbon feeds characterized by vanadium concentrations of at least 1 ppm wherein the catalyst comprises zeolite, a matrix, and a vanadium passivating agent in the form of a stabilized anatase crystalline form of $TiO_2$. The vanadium passivating agent is prepared by mixing a titanium salt compound with a compound selected from phosphorus, sulphur, niobium and mixtures thereof so as to produce the stabilized anatase titanium oxide as $TiO_2/P_2O_5$, $TiO_2/SO_4^=$, and $TiO_2/Nb_2O_5$ and mixtures thereof. The catalyst of the present invention is prepared by impregnating the matrix with the vanadium passivating agent and thereafter mixing with zeolite.

Further, in accordance with the present invention, there is provided an improved process for the conversion of vanadium containing hydrocarbon feeds into lower boiling point hydrocarbon products by employing the catalyst of the present invention as described above.

DETAILED DESCRIPTION

The catalyst composition of the present invention will comprise a crystalline aluminosilicate zeolite, a matrix material, and an effective vanadium passivating agent in the form of stabilized anatase crystalline $TiO_2$.

The crystalline aluminosilicate zeolite which can be employed in the present invention include natural zeolites such as faujasites, sodalite, offretite, modernite, ferrierite, chabazite and the like, previously ion exchanged in order to decrease alkaline metals content and increase their hydrothermal stability. The content of zeolite material in the final catalyst can vary between 5 and 40 wt.%.

The matrix can be formed by inorganic oxides such as silica, silica-alumina, silica-anatase-phosphorus, silica-anatase-sulphate, natural clays such as kaolin, halloysite, montmorillonite or mixtures of these materials. In the case of silica or silica-alumina the matrix is first formed as a gel which is then washed and ion exchanged by usual methods of the preparation art at a given silica/alumina ratio. The matrix component can be present in the final catalyst of the present invention in the range between 60-95% by total weight of the catalyst.

Other materials such as oxides of Ti, Fe, Mg and their mixtures, with a substantially lower activity than the zeolite component or the matrix, that can be formed during the preparation process and will not affect final characteristics of the catalyst might be present in the final catalyst in a range between 0.001 and 20.0% by weight.

The passivation agent consists of anatase phase titanium oxide doped with phosphate, sulphate or niobium which is separately prepared or precipitated on the matrix previously to mixing with the stabilized zeolite component. This passivation agent can also be added separately to the circulating catalyst in a powder form because it has the ability to catch vanadium present in the equilibrium catalyst.

It is well known that FCC feedstocks containing vanadium deactivates severely catalyst activity through a loss of zeolite crystallinity. This activity loss normally starts to occur at vanadium contents of approximately 1.0 ppm, at levels between 5000 and 10,000 ppm an almost complete destruction of the zeolite structure of the catalyst can be observed. This phenomenon takes place during catalyst regeneration by migration of vanadium towards the crystalline component forming an eutectic compound with the zeolite with a subsequent destruction of the crystalline material.

In the catalyst composition of the present invention the vanadium passivation agent takes advantage of the activation of $V_2O_5$ on anatase through reduction of $V^{5+}$ to a lower oxidation state and fixing of vanadium on this surface. Under this anatase form, vanadium oxides do not affect zeolitic structure and the interaction forms a solid solution during the solid state transition anatase-rutile, doping agents such as phosphates or sulphates or Niobium slow down phase change from anatase to rutile. In the present invention it is fundamental that titanium oxide be under anatase structure, this is the only phase which allows an adjustment with vanadium oxides $V^{2+}$ and $V^{4+}$ and fitting of vanadium with formation of compounds of the $V_xTi_{1-x}O_2$ type in which $V^{4+}$ substitutes titanium in the anatase network. Concentration of the passivating agent on the final catalyst of this invention is in the range varying between 3-50 wt.% in the form of $TiO_2/P_2O_5$, $TiO_2/SO_4^=$, $TiO_2/Nb_2O_5$ or mixtures thereof where the ratio of $TiO_2/P_2O_5$ or $TiO_2/SO_4^=$ or $TiO_2/Nb_2O_5$ is between 5:1 to 20:1.

The advantages of the catalyst of the present invention will be made clear from the following examples.

EXAMPLE 1

The vanadium passivating agent was prepared by neutralizing $TiCl_4$ with a solution of $NH_4OH$ so as to precipitate $Ti(OH)_4$ and, thereafter, in order to obtain a molar ratio of $TiO_2/P_2O_5$ in the final catalyst of 10:1 the precipitate is mixed with $PO_4^=$ solution in the form of phosphorus acid.

A first catalyst Composition A was prepared by combining 20 wt.% rare earth exchange zeolite Y with a silica/alumina matrix and mixed with water so as to obtain a water slurry having 20 wt.% solid content. The slurry was spray dried and calcined at 550° C. in a fluidized bed furnace for a time of 2 hours. The second catalyst Composition B, was prepared in accordance with the present invention following the same procedure as set forth above with regard to Catalyst A with the exception that the silica/alumina matrix was first diluted in water to form a slurry containing 20% silica/alumina. The slurry was kept under agitation and a solution of $Ti(OH)_4$ plus $PO_4^=$ was added to impregnate the surface of the silica/alumina. This mixture was filtered and washed and then reslurried and mixed with the rare earth exchange zeolite Y to obtain the following catalyst composition: 20% by weight zeolite, 10% by weight $TiO_2/P_2O_5$ in which the ratio of $TiO_2/P_2O_5$ was equal to 10:1 and the balance of the catalyst was a silica/alumina matrix.

Catalysts A and B were evaluated in a microactivity test unit. Prior to testing the catalysts were steamed at 750° C. for 4 hours in a 100% steam environment at atmospheric pressure in order to simulate equilibrium surface area and activity. The catalyst cracking conditions were 520° C., a space velocity of 20 $h^-$ WHSV and a catalyst to oil ratio of 3.0. The gas oil feed to the reactor in this and subsequent examples is characterized as follows:

| Gravity, °API | 28.7 |
|---|---|
| S.G. | 0.833 |
| Sulfur, wt. % | 0.49 |
| Nitrogen, ppm | 0.10 |
| CCR, wt. % | 0.15 |
| Aniline point, °F. | 182 |
| Nickel, ppm | 0.1 |
| Vanadium, ppm | 0.2 |
| Copper, ppm | 0.1 |
| Iron, wt. % | 11.75 |

| Distillation | |
|---|---|
| Vol. % | Temp, °F. |
| IBP | 373 |
| 5 | 502 |
| 10 | 540 |
| 20 | 593 |
| 30 | 641 |
| 40 | 678 |
| 50 | 712 |
| 60 | 758 |
| 70 | 816 |
| 80 | 870 |
| 90 | 940 |
| 965 | 991 |
| FBP | 1041 |

In order to test the passivation effect of our new matrix, Catalysts A and B were impregnated to 3000 and 10000 ppm of vanadium from a solution of vanadium naphtenate in cyclohexane by incipient wetness, then dried at 120° C. for 4 hours and calcined to 680° C. for 3 hours. In some cases, and in order to determine post-deactivation effect, catalysts were steamed again under conditions mentioned above.

Results obtained by employing Catalysts A and B containing different levels of vanadium are shown in Table I. A catalyst labeled as Bd-3Vd means Catalyst B first steamed to deactivate, then impregnated with 3,000 ppm of vanadium with a further steam deactivation at 760° C., 5 hours, 100% steam.

TABLE I

| Runs | Catalysts | Conversion, Vol. % | S am 2/grs. |
|---|---|---|---|
| 1 | A | 64 | 120 |
| 2 | B | 65 | 118 |
| 3 | A-3Vd | 52.5 | 64 |
|   | A-10Vd | 27.5 | 45 |
| 4 | B-3Vd | 63.8 | 114 |
|   | B-10Vd | 62.9 | 108 |
| 5 | Ad-3V | 51.8 | 49 |
|   | Bd-3V | 64.5 | 115 |
| 6 | Bd-3Vd | 62.3 | 107 |
|   | Bd-10Vd | 59.8 | 99 |
| 7 | Ad-3Vd | 48.5 | 59 |
|   | Ad-10Vd | 22.3 | 41 |

Results in Table I show the effect of phosphorus stablized anatase as a vanadium passivation agent. Catalysts A and B have similar MAT activities. Once they are impregnated with vanadium at 3,000 and 10,000 ppm and then steam deactivated, activity of Catalyst A decreases to very low values, while Catalyst B keeps the same activity.

For catalysts first deactivated and then impregnated with vanadium plus drying and calcining a similar effect is observed, i.e., Catalyst A shows a lower activity while activity for Catalyst B remains approximately the same as when it was not impregnated.

Other values in Table I show results for catalysts deactivated before and after impregnation. In both cases activity levels start to decrease but the effect is more pronounced for Catalyst A.

EXAMPLE II

In this example the catalyst of the present invention was prepared in accordance with the procedure set forth in Example I above so as to obtain a catalyst composition set forth below in Table II referred to as Catalyst C. Catalyst C was compared with two commercially available Catalysts D and E having the composition set forth below in Table II.

TABLE II

| Composition | C | D | E |
|---|---|---|---|
| $Al_2O_3$, wt. % | 39 | 32.3 | 54.5 |
| $SiO_2$, wt. % | 47 | 51.6 | 43.1 |
| $Na_2O$, wt. % | 0.48 | 0.65 | 0.5 |
| Anatase $TiO_2/P_2O_5$, wt. % | 10 | — | — |
| $Re_2O_3$, wt. % | 2.5 | 2.35 | 2.0 |
| Zeolite, wt. % | 20 | 20 | 25 |

All three catalysts are similar in terms of their zeolite content. The catalysts were impregnated with 4,000 and 10,000 ppm vanadium. Prior to impregnation the catalysts were steamed at 760° C. for 5 hours in a 100% steam environment at atmospheric pressure. In order to determine selectivity the catalysts were evaluated in a first bed reactor in which reaction regeneration recycles were carried out subsequently. Each catalyst was subjected to 10 to 12 cycles in order to obtain enough samples to carry out mass balances and selectivity tests.

The feed set forth in Table I was subject to the following cracking conditions employing the catalysts described in Table II above.

Operation conditions are given below:

| | |
|---|---|
| Reaction Temp, °F. | 970 |
| Regeneration Temp, °F. | 1250 |
| C/O | 4 |
| WHSV, h$^{-1}$ | 30 |

Table III shows results obtained with fresh deactivated catalysts and catalysts impregnated at 4000 and 10000 vanadium ppm.

TABLE III

| | C | | | D | | | E | | |
|---|---|---|---|---|---|---|---|---|---|
| Vanadium Cont, ppm | — | 4000 | 10000 | — | 4000 | 10000 | — | 4000 | 10000 |
| Conversion, Vol % | 65.3 | 62.4 | 58.6 | 67.1 | 58.2 | 42.5 | 74.3 | 60.8 | 53.9 |
| Yields | | | | | | | | | |
| $C_2-$ wt. % | 2.3 | 2.1 | 2.4 | 2.3 | 3.4 | 5.2 | 2.5 | 3.8 | 6.3 |
| $C_5-$ 430° F. Gas. Vol. %; | 50.6 | 51.2 | 48.7 | 53.2 | 46.3 | 35.6 | 61.2 | 47.8 | 43.5 |
| 430–650 LCGO Vol. % | 18.6 | 21.1 | 21.0 | 14.5 | 16.2 | 12.8 | 13.4 | 19.2 | 16.3 |
| 650° F.+ HCGO Vol. % | 16.1 | 16.5 | 20.4 | 18.4 | 25.6 | 44.7 | 12.3 | 20.0 | 30.8 |
| Alkylate ($C_3=$ + $C_4=$ $IC_4$) Vol. % | 21.0 | 16.8 | 17.2 | 19.1 | 18.5 | 14.4 | 19.3 | 17.5 | 15.8 |

Results on Table III clearly shows that Catalyst C which is approximately similar in activity to commercial Catalyst D, is more vanadium tolerant. At 4000 ppm of vanadium in both catalysts, Catalyst C keeps the same conversion and gasoline selectivity while Catalyst D decreases in both. The same happens with coke selectivity and even more gasoline+alkylate and gasoline+LCO are the same or higher for Catalyst C.

At 10,000 ppm of vanadium, Catalyst D activity and gasoline production decrease at very low levels while coke value is higher indicating destruction of zeolite and loss in selectivity.

On the other hand Catalyst E is initially very active but after impregnation its activity and gasoline production are lower than for Catalyst C. At 10,000 ppm of vanadium Catalyst E deactivates while Catalyst C has an activity which remains at high levels.

EXAMPLE III

The uniqueness of the anatase stabilized phase of $TiO_2$ in passivation of the poisonous effect of vanadium in the catalyst of the present invention was demonstrated by comparing it with titanium dioxide in the rutile form. Catalyst F was prepared in accordance with the method described in Example I but instead of impregnation a suspension containing phosphorus stabilized anatase was mixed with a slurry containing rare earth exchanged zeolite plus silica-alumina gel, this combination was agitated then spray-dryed and calcined 4 hours at 550° C. Similarly a Catalyst G was prepared by mixing a slurry containing rutile with a suspension of zeolite plus silica-alumina gel, the mixture was then spray-dryed and calcined under the same conditions as for Catalyst F.

Final composition of Catalysts F and G are shown in Table IV.

TABLE IV

| | Catalyst F | Catalyst G |
|---|---|---|
| $Al_2O_3$, wt. % | 40.21 | 41.63 |
| $SiO_2$, wt. % | 48.52 | 49.67 |
| $Na_2O$, wt. % | 0.46 | 0.45 |
| Anatase/$P_2O_5$, wt. % | 10.5 | — |
| Rutile, wt. % | — | 11 |
| $Re_2O_3$, wt. % | 2.35 | 2.5 |
| Zeolite (crystallinity) | 20.0 | 19.5 |

Results show that chemical composition for both catalysts is similar except that Catalyst F contains stabilized anatase and Catalyst G contains rutile. Both chemical species are titanium oxides in different crystalline forms.

Evaluation of both catalysts was done in fix fluidized bed unit. Prior to evaluation, catalysts were steamed at the same conditions described in Example I. After steaming, the catalysts were impregnated with 10,000 ppm of vanadium. Results for Catalysts F and G fresh steamed and impregnated with vanadium are shown in Table V.

TABLE V

| | F | | G | |
|---|---|---|---|---|
| Vanadium, ppm | — | 10,000 | — | 10,000 |
| Conversion Vol. % | 66.5 | 61.6 | 65.9 | 43.8 |
| Yields | | | | |
| $C_2-$ wt. % | 2.41 | 3.2 | 2.5 | 4.7 |
| $C_5-$ 430° F. Gasol. Vol. % | 53.2 | 51.7 | 51.8 | 36.3 |
| 430–650° F. LCGO, Vol. % | 20.6 | 22.3 | 20.3 | 14.6 |
| 650+ °F. HCGO Vol. % | 12.9 | 16.1 | 13.8 | 41.6 |
| Alkylate ($C_3=$ + $C_4=$ $IC_4$), Vol. % | 19.8 | 18.4 | 20.4 | 17.8 |

Results in Table V clearly show that rutile phase of the titanium oxide is not a passivating agent of the vanadium effect on FCC catalysts and it will not prevent destruction of the zeolite by vanadium.

It is clear from the foregoing examples that titanium oxide is an effective passivating agent when used in its stabilized anatase crystalline form.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for the preparation of a cracking catalyst for use in the demetallization of hydrocarbon feeds characterized by a vanadium concentration of at least 1.0 ppm consisting essentially of: providing a matrix material with added aluminosilicate zeolite; diluting said matrix in water so as to form a slurry; preparing a vanadium passivating agent containing a stabilized anatase crystalline form of $TiO_2$ as $TiO_2/P_2O_5$, $TiO_2/SO_4^=$, $TiO_2/Nb_2O_5$ and mixtures thereof; and impregnating said matrix with said vanadium passivating agent.

2. A method according to claim 1 further including preparing said vanadium passivating agent by neutralizing a titanium salt compound so as to precipitate $Ti(OH)_4$ and thereafter doping said precipitate solution with an element selected from the group consisting of phosphorus, sulfur, niobium and mixtures thereof so as to obtain a stabilized anatase crystalline form of $TiO_2$.

3. A method according to claim 1 wherein said matrix is selected from the group consisting of silica, silica-alumina, silica-anatase-phosphorus, silica-anatase-sulfate, kaolin, halloysite, montmorillonite and mixtures thereof.

4. A method according to claim 3 wherein said matrix is present in said final catalyst in an amount of about between 60 and 95 wt.%.

5. A method according to claim 1 wherein said zeolite is present in the final catalyst in an amount of about 5 to 40 wt.%.

6. A method according to claim 1 wherein said vanadium passivating agent is present in said final catalyst in an amount of about 3 to 50 wt.%.

7. A method according to claim 2 wherein said vanadium passivating agent is present in said final catalyst in an amount of about 3 to 50 wt.%.

8. A method according to claim 3 wherein said ratio of $TiO_2$ to said doping element in the final catalyst is in the range of about 5:1 to 20:1.

* * * * *

UNITED STATES PATENT AND TRADEMARK OFFICE
CERTIFICATE OF CORRECTION

PATENT NO. : 4,894,354
DATED : January 16, 1990
INVENTOR(S) : NELSON P. MARTINEZ ET AL.

It is certified that error appears in the above-identified patent and that said Letters Patent is hereby corrected as shown below:

In Column 8, claim 8, line 17, change "claim 3" should read --claim 2--.

Signed and Sealed this

First Day of January, 1991

Attest:

HARRY F. MANBECK, JR.

*Attesting Officer*  *Commissioner of Patents and Trademarks*